Patented Mar. 25, 1952

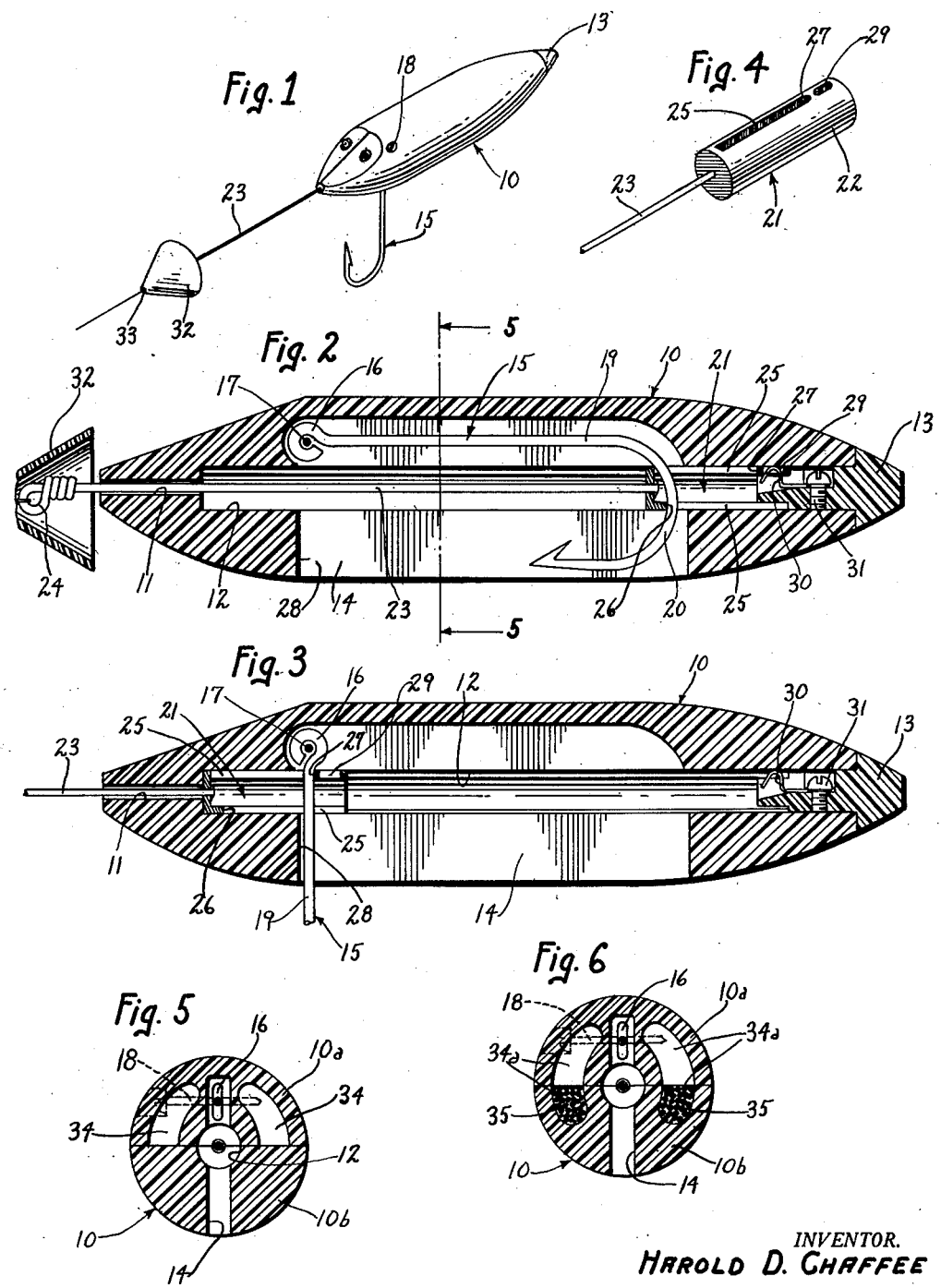

2,590,752

UNITED STATES PATENT OFFICE 2,590,752

FISHING PLUG

Harold Dwight Chaffee, Bedford, Ohio

Application May 27, 1950, Serial No. 164,795

6 Claims. (Cl. 43—37)

My invention relates to fishing plugs and the principal object of my invention is to provide new and improved fishing plugs.

My invention provides a plug that is practically snagproof and thus may be used in waters containing weeds, debris and the like which snag the ordinarg fishing plug. Further, my invention provides a plug of simple, yet efficient and durable design, so that it may be economically produced without sacrificing desirable qualities.

In the drawing accompanying this specification and forming a part of this application, there is shown, for purposes of illustration, an embodiment which my invention may assume, and in this drawing:

Figure 1 is a perspective view of a plug illustrating an embodiment of my invention.

Figure 2 is an enlarged central longitudinal section taken through the plug, and showing parts in one position, Figure 3 is a view similar to Figure 2, but with parts in another position, Figure 4 is an enlarged perspective view of a detail, Figure 5 is a transverse sectional view corresponding generally to the line 5—5 of Figure 2, and Figure 6 is a view similar to Figure 5, but showing slightly different construction.

Referring to the drawing, the embodiment of my invention herein disclosed comprises a body 10 which may be formed of any suitable material and may be shaped to simulate a small fish or any other type of bait. As herein shown, the intermediate portion of the body 10 is generally cylindrical and is provided with tapering end portions.

The body 10 is formed with a longitudinal opening comprising a short small-diameter portion 11 at the fore part of the body and a communicating larger-diameter portion 12 extending substantially the length of the body. A closure plug 13 preferably closes the rear end of the opening portion 12, such plug being held in position in any desired manner, such as by cementing it in assembled relation with the body.

A longitudinal slot 14 extends diametrically of the body and intersects the opening portion 12 so as to have parts disposed on either side of the portion 12. Preferably the slot 14 opens on only one surface of the body as herein shown.

A hook 15 is pivotally carried by the body and in the present embodiment the hook is of standard construction and has its eye portion 16 passing a pivot pin 17 which extends transversely of the body. The pin 17 may be formed by a woodscrew 18 which extends through a transverse opening in the body 10 and which has its shank extending through the eye portion 16 and has its extremity threaded into the body. Thus, the hook 15 may be easily assembled with and removed from the body 10.

As seen in Figure 2, the hook 15 is adapted to be moved to position wherein its shank portion 19 and barb portion 20 are disposed entirely within the slot 14 so that the body 10 has a smooth exterior and thus may be drawn through weeds and debris without fouling. The hook 15 is adapted to be moved to a position wherein it extends laterally of the body, as seen in Figure 3, wherein it is in operative position to hook a fish.

In the embodiment herein disclosed, the means for effecting movement of the hook to and from its positions comprises actuator means 21 which may be in the form of a cylindrical member 22 of a size so that it is held to reciprocable movement within the opening portion 12. The member 22 may be reciprocated by means of a rod 23 which has one end connected to the member and its opposite end extending through the opening portion 11 and outwardly of the fore part of the body. The outwardly extending portion of the rod 23 provides for connection with the usual fishing line, as shown at 24.

The actuator means 21 is here shown as of tubular formation, and is provided with an elongated slot 25 in diametrically opposite wall portions. A portion of the hook 15 is adapted to extend through the slots 25 in any position of the hook so as to provide cam relation between the hook and the actuator means.

In the embodiment herein disclosed, the opposite terminal ends of the slots 25 are adapted to provide for shifting movement of the hook. Referring to Figure 2, the actuator means 21 is in its rear-most position, and in such position the terminal end 26 of the slot 25 bears against the curved part of the barb portion 20 and holds the hook in retracted relation within the body 10.

A pull on the rod 23, such as may be occasioned when a fish strikes the bait, causes the actuator means 21 to move outwardly in the opening portion 12, the hook 15 being largely unaffected until the terminal end 27 of the slot 25 engages the curved part of the barb portion 20, whereupon continued forward movement of the actuator means 21 causes the hook 15 to swing to its laterally extended position shown in Figure 3, When the actuator means 21 has been fully extended, the terminal end 27 will hold the hook 15 in laterally extended position since the shank portion 19 of the hook is interposed between the terminal end 27 and a shoulder 28 formed by the adjacent end of the longitudinal slot 14.

The hook 15 may be shifted to its retracted position by a rearward push on the rod 23, such action causing the terminal end 26 of the slot 25 to engage and move the hook. Means are provided to yieldably hold the hook 15 in retracted position, and in the embodiment herein disclosed, the plug 13 is provided with a spring detent which is adapted to seat in a recess 29 formed in the actuator means 21. The detent may be formed by a bent portion 30 of spring wire, the wire being held assembled with the plug by means of a screw 31.

In Figures 1 and 2, a protector device 32 is shown for the purpose of protecting the connection of the rod 23 with the fishing line against fouling, and such device may take the form of a conical member of plastic or other suitable material, having a central aperture 33 through which the end of the fishing line may be threaded prior to its connection with the rod 23.

The body 10 may be molded from plastic material and may be formed in longitudinal sections. Referring to Figure 5, the body 10 is formed of molded halves 10a and 10b which are cemented together at their longitudinal meeting surfaces. One of the sections, such as the section 10a, may be formed with inwardly extending recesses 34, which recesses also extend some distance longitudinally of the body. When the sections 10a and 10b are cemented together, the recesses 34 form water-tight chambers which provide for buoyancy.

In the event it is desired to provide a body of controlled buoyancy, such for example where it is desired that the body shall float partly submerged in the water, both sections 10a and 10b are provided with inwardly and longitudinally extending recesses 34a and weighted material 35, such as shot or the like, is disposed in proper amount in one or both of the recesses prior to the operation of cementing the body halves together.

In view of the foregoing, it will be apparent to those skilled in the art that I have accomplished at least the principal object of my invention, and it will also be apparent to those skilled in the art that the embodiment herein discribed may be variously changed and modified, without departing from the spirit of the invention, and that the invention is capable of uses and has advantages not herein specifically described; hence it will be appreciated that the herein disclosed embodiment is illustrative only, and that my invention is not limited thereto.

I claim:

1. A fishing plug, comprising: body means, having a longitudinal opening; hook means pivotally carried by said body means and shiftable from a position generally protected by said body means to a position extended from said body means, said hook means having a portion extending from its pivot to its barb portion; and actuator means slidable along said longitudinal opening and having a slot extending therethrough and through which said extending portion of said hook extends, the opposite terminal ends of said slot having cam relation with said extending portion, the respective ends being operable to move said hook means from one position to another upon movement of said actuator means in a respective direction, and to hold said hook means in such other position.

2. A fishing plug, comprising: body means, having a longitudinal opening; hook means carried by said body means and shiftable from a position generally protected by said body means to a position extended from said body means; actuator means for effecting shifting movement of said hook means and having a recess; and spring-pressed latch means engageable within said recess for selectively holding said actuator means against movement.

3. A fishing plug, comprising: body means, having a longitudinal opening; hook means pivotally carried by said body means and shiftable from a position generally protected by said body means to a position extended from said body means; actuator means provided with a recess and mounted for reicprocable movement within said longitudinal opening and having cam interengagement with said hook means whereby said hook means is movable to its various positions through movement of said actuator means; and a spring detent engageable within said recess of said actuator means when the latter has reached a predetermined position in said longitudinal opening, and operable to yieldably hold said actuator means in said predetermined position.

4. A fishing plug, comprising: body means, having a longitudinal opening; hook means pivotally carried by said body means and shiftable from a position generally protected by said body means to a position extended from said body means; actuator means mounted for reciprocable movement within said longitudinal opening, and having cam interengagement with said hook means whereby said hook means is movable to its various positions through movement of said actuator means; plug means disposed within an end of said longitudinal opening; and detent means carried by said plug means and engageable with said actuator means to yieldably hold said actuator means against movement.

5. A fishing plug, comprising: a body having a longitudinally extending opening and a longitudinally extending slot providing communication between said opening and the exterior of said body; a hook, having one end pivoted to said body so that its shank and barb portions are swingable through said slot from a position within said body to a position laterally extending from said body; actuator means mounted within said longitudinally extending opening for reciprocation axially thereof; a rod for effecting movement of said actuator means; said actuator means having an elongated slot extending therethrough and through which a portion of said hook extends in any of its positions, and also having a recess spaced from said elongated slot, respective ones of the opposite terminal ends of said elongated slot being operable to move said hook to and hold said hook in a respective position; and detent means engageable within the recess in said actuator means when said hook has been moved to position within said body, for yieldably holding said actuator means against movement.

6. A fishing plug, comprising: body means having a longitudinal opening and also having a longitudinally extending slot providing communication between said opening and an exterior surface of said body means; hook means pivotally carried by said body means for swinging movement through said slot, and shiftable from a position generally within said body means to a position wherein its hook portion extends laterally from said body means, said hook means including a shank portion, a curved portion and a barb portion, said curved portion connecting said barb portion with said shank portion; and actuator means mounted for reciprocable movement within said longitudinal opening, and having an elongated slot extending therethrough, one terminal end of said slot, when said actuator means is moved in one direction, having cam engagement first with said curved portion and then with said shank portion to move said hook means from position within said body means to laterally extended position, and the other terminal end of said slot, when said actuator means is moved in an opposite direction, having cam engagement first with said shank portion and then with said curved portion to move said hook means back to position within said body means.

HAROLD DWIGHT CHAFFEE.

REFERENCES CITED

The following references are of record in the file of this patent:

UNITED STATES PATENTS

| Number | Name | Date |
|---|---|---|
| 778,875 | Mathews | Jan. 3, 1905 |
| 1,209,237 | Warren | Dec. 19, 1916 |
| 1,791,084 | Pike | Feb. 3, 1931 |
| 2,106,755 | McArthur | Feb. 1, 1938 |
| 2,159,606 | Scogland | May 23, 1939 |
| 2,241,367 | Sarff | May 6, 1941 |
| 2,256,088 | Hogan | Sept. 16, 1941 |
| 2,436,232 | Shetka | Feb. 17, 1948 |
| 2,474,383 | Suhr | June 28, 1949 |